May 22, 1934.  W. SCHROEDER  1,959,878
BRAKE MECHANISM FOR VEHICLES
Filed June 15, 1931  3 Sheets-Sheet 1
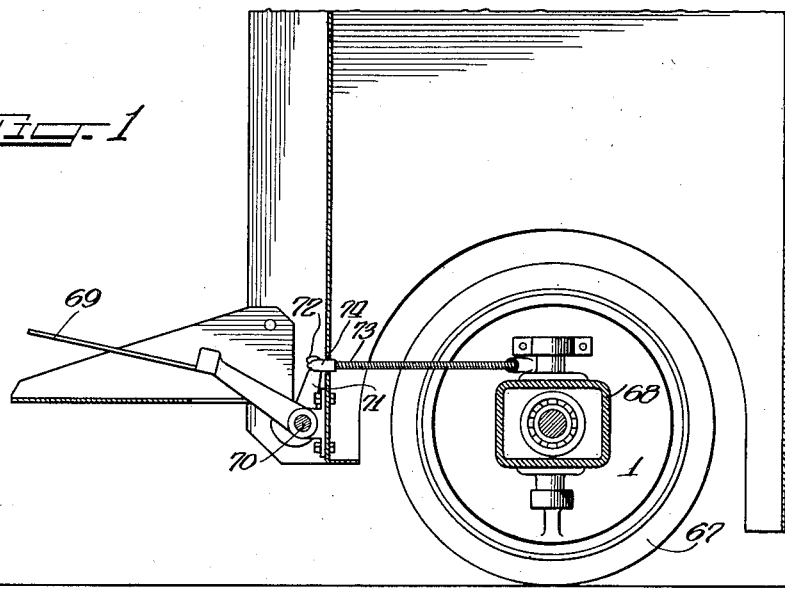
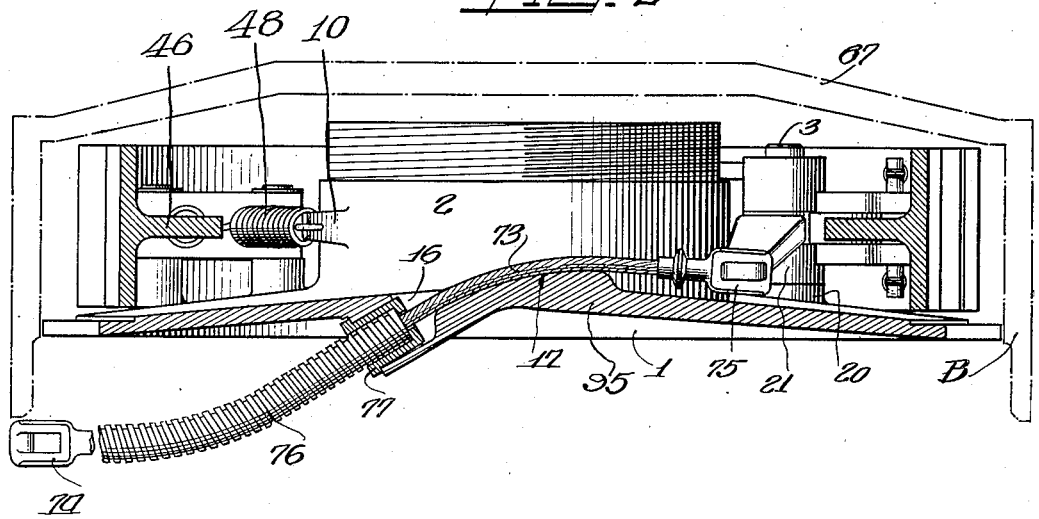
Inventor:
William Schroeder.
by Charles Hill
Attys.

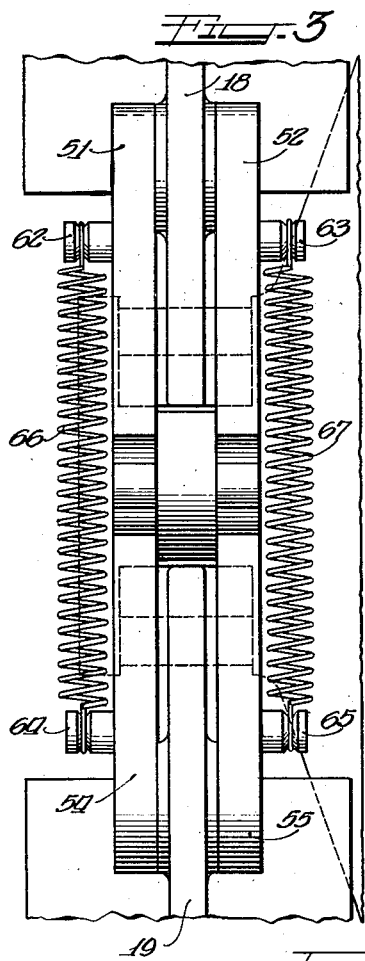

May 22, 1934.  W. SCHROEDER  1,959,878
BRAKE MECHANISM FOR VEHICLES
Filed June 15, 1931  3 Sheets-Sheet 3
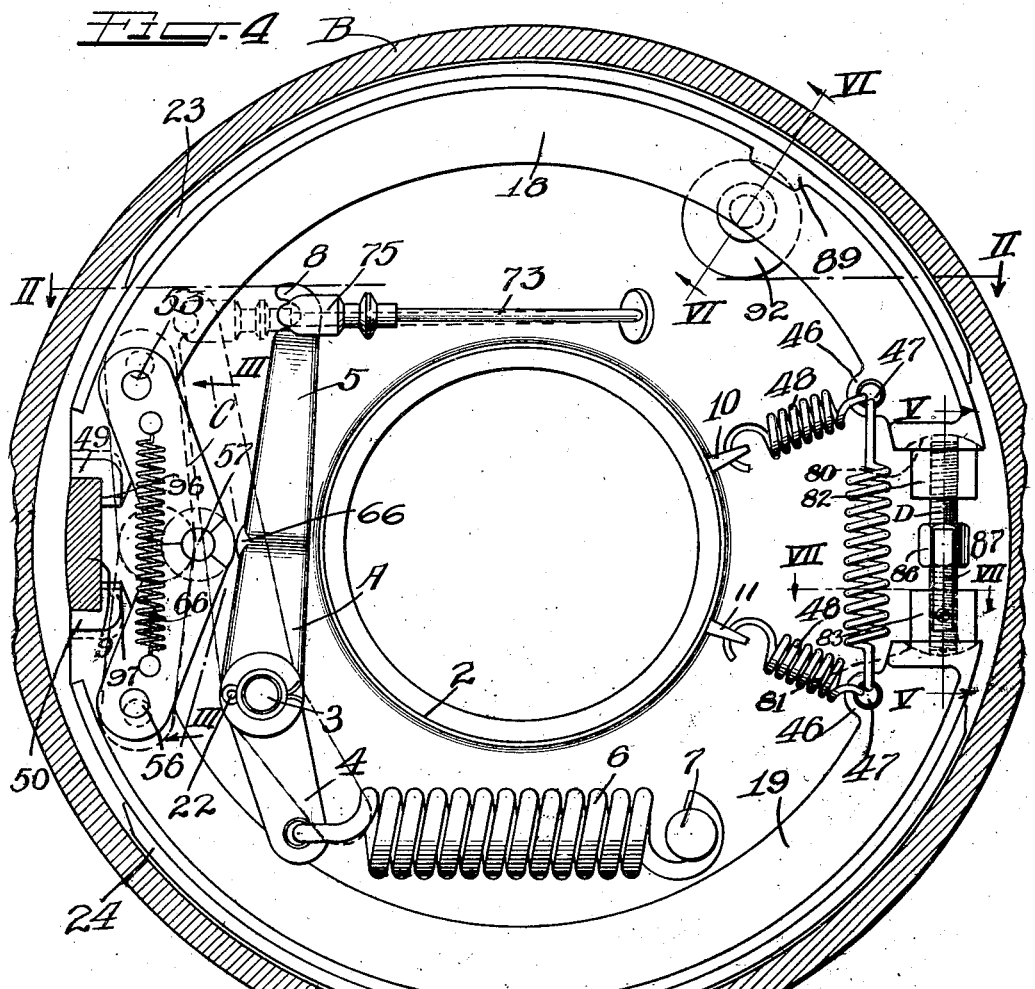
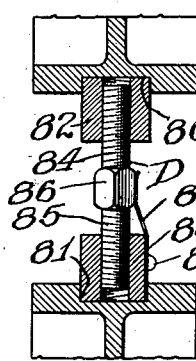
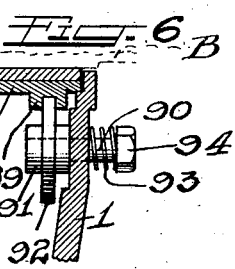
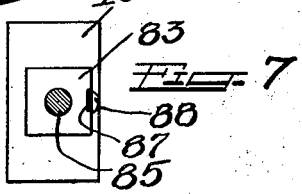
Inventor:
William Schroeder
by Charles W. Hills Patented May 22, 1934

1,959,878

UNITED STATES PATENT OFFICE 1,959,878

BRAKE MECHANISM FOR VEHICLES

William Schroeder, Chicago, Ill., assignor to Mercury Manufacturing Company, Chicago, Ill., a corporation of Illinois Application June 15, 1931, Serial No. 544,398

6 Claims. (Cl. 188—21)

The present invention relates to brake mechanism for vehicles and particularly to a brake arrangement whereby the brake shoes are always maintained in centralized position.

The present invention is directed to features of construction of internal expanding brakes for motor vehicles and the like and has particular reference to a method of directing the ends of the brake shoes against an anchor without imparting an outward or radial force and also means for centralizing the shoes.

An object of the present invention is to provide means for maintaining brake shoes of motor vehicles in centralized position.

Another object of the invention is to provide a novel arrangement for preventing brake shoes of the internal expanding type from moving out of proper relative position so that the shoes are ready at all times to be moved into braking engagement in a centralized position.

Generally speaking the invention contemplates the utilization of two brake shoes which are separated by a spacer or separator which at the same time serves as means for centralizing the brake shoes and which is effective in non-radial directions.

The invention further contemplates a brake mechanism wherein the brake is normally in braking engagement with a drum and which is actuated to release position by suitable actuating means.

The above, other and further objects of the invention will be apparent from the following description, accompanying drawings, and appended claims.

Embodiments of the present invention are illustrated in the accompanying drawings and the views thereof are as follows:

Figure 1 is a sectional view through a motor vehicle equipped with a brake of the present invention and showing one means for releasing the brake.

Figure 2 is an enlarged sectional view taken substantially in the plane of line II—II of Figure 3.

Figure 3 is an enlarged fragmental view taken substantially in the plane of line III—III of Figure 4 showing details of the toggle employed for moving the shoes into and out of braking position.

Figure 4 is a side elevational view of a fragmental portion of a brake drum, and associated therewith is shown brake mechanism embodying the principles of the present invention, and showing in full lines the brake in off or released position and in dotted lines the brake shoes in normal braking or set position.

Figure 5 is a vertical sectional view taken substantially in the plane of line V—V of Figure 4.

Figure 6 is a sectional view taken substantially in the plane of line VI—VI of Figure 4.

Figure 7 is a sectional view taken substantially in the plane of line VII—VII of Figure 4.

The drawings will now be explained.

The present invention is illustrated in connection with an industrial truck such for instance as that described in the copending application of this applicant, Serial No. 541,309.

A circular plate 1 is provided with a hub 2 which is suitably supported on a vehicle axle. On the interior of the plate 1 a crank A is pivoted at 3. The crank has two portions 4 and 5 extending in opposite directions from the pivot 3. The portion 4 is shorter than the portion 5 for providing lever arms of different effect.

A heavy spring 6 is attached at one end to a projection 7 secured to the plate 1 and at its other end is hooked into the shorter arm 4 of the crank A. The spring is effective normally to urge the end of the shorter arm 4 of the crank A towards the pin 7 which fastens the spring to the plate 1. The outer end of the other arm 5 is provided with a hook 8.

A stop plate 9 is formed as a part of the disc or plate 1 and extends inwardly from the inner surface of said disc. Lugs 10 and 11 are formed integrally with the disc 1 and these lugs have apertures in the same.

The disc 1, hub 2, the stop member 9 and the lugs 10 and 11 may be formed as an integral casting and preferably are made in this manner.

The disc 1 has an opening 16 formed in the same and with a portion of the body thereof curved as at 17, the curve merging into the opening 16 and forming a shoulder. The inner portion of the shoulder thus formed projects a slight distance inwardly of the inner surface of the disc 1 at this point.

The shoulder 95 thus formed serves as a rest for a flexible cable passing through the opening 16 for actuation of the crank A as will be more fully explained hereinafter.

Two brake shoes 18 and 19 are carried by the disc 1. Each of the shoes is in circular length less than 180° and both shoes cooperate with the brake drum B for braking purposes. The drum B is carried on the wheel with which the brake mechanism of the present invention is associated.

The disc 1 and its associated parts when mounted in a vehicle is fixed against rotative movement.

A pivot pin 3 supporting the crank A is mounted in a boss 20 formed as an integral part of the disc 1. A suitable collar 21 is interposed between the boss 20 and the crank A. The crank A is maintained on its pivot 3 by means of locking means such for instance as a cotter pin 22.

Each of the brake shoes 18 and 19 is provided with brake bands 23, 24 respectively as is customary.

For the sake of convenience the ends of the shoes 18 and 19 shown at the right of Figure 4 of the drawings will herein be referred to as the inner ends while the other ends of the shoes will be herein referred to as the outer ends. Such nomenclature is merely for the purpose of convenience and should not be construed as limitations.

Each brake shoe is provided with a lug 46 near its inner end which lugs are apertured at 47. Springs 48 are provided with an end hooked into the aperture in the lug 10 and the lug 46 of the adjacent shoe 18 and similarly the other spring 48 has an end hooked into the aperture in the lug 11 with its opposite end hooked into the apertured ear 46 on the adjacent brake shoe 19. These springs tend to pull the inner ends of the shoes towards the center of the disc 1 and being disposed in angular relation to the ends of the shoes tends to draw the inner ends of the shoes towards each other, that is, maintain the inner ends of the shoes in engagement with the adjusting collars 32 and 33 on the adjusting bolt 27.

The outer ends of the brake shoes 18 and 19 are notched at 49 and 50 for engagement with the stop member 9 to limit movement of the outer ends towards each other, and to limit the movement of the outer ends of the shoes in a direction away from the drum axis for centering the shoes.

Toggle means C are provided for actuating the outer ends of the brake shoes into and out of braking relation with the drum B.

The toggle means include two similar bars 51, 52 each of which is pivoted at its upper end at 53 adjacent the outer end of the brake shoe 18. Similarly two other bars 54 and 55 are pivoted at their outer ends at 56 near the outer end of the brake shoe 19. The other ends of the bars 51, 52 and 54 and 55 are pivoted together by a pin 57 passing through all of these bars and suitably fastened in position. The ends of the bars 51, 52 at the pivot 57 are provided with stop faces 58 and 59 on opposite sides of the pivot 57. Similarly the bars 54 and 55 are provided with like stop faces 60 and 61 which are on opposite sides of the pivot 57. The faces 58 and 60 are brought into contact to limit the movement towards each other of the outer ends of the brake shoes 18 and 19 when the brake is released.

Faces 59 and 60 are provided to limit the maximum spread of the outer ends of the shoes 18 and 19 when moved into braking position.

The bars 51 and 52 are each provided with a stud 62 and 63 respectively while the bars 54 and 55 are provided each with a stud 64 and 65. A spring 66 is fastened to the studs 62 and 64 while a similar spring 67 is fastened to the studs 63 and 65. The function of the springs 66 and 67 is to draw together the pivot points 53 and 56 that is draw together the outer ends of the brake shoes 18 and 19.

The arm 5 of the crank A is provided with a protuberance 66 disposed to bear against the ends of the arms 51, 52 and 54 and 55 at the pivot 57 for moving the pivot 57 of the same to the left as viewed in Figure 4 for applying the brake against the action of the springs 66 and 67.

Normally the heavy spring 6 maintains the brake shoes 18 and 19 in braking engagement with the drum B by drawing inwardly the lower arm 4 of the crank A and thus forcing outwardly, as viewed in Figure 4, the arm 5 tending to straighten the members of the toggle C to apply the brakes.

The brake mechanism of the present invention is illustrated in connection with an industrial truck such as that disclosed in applicant's copending application referred to above.

Figure 1 illustrates a wheel 67 equipped with the brake mechanism of the present invention. The disc 1 is suitably mounted on the dead axle 68.

A brake pedal 69 is pivoted at 70 to the frame structure of the truck. A lever 71 is formed with a portion of the pedal 69 and has a hook 72 at its end.

A cable 73 passes through the opening 16 in the disc and rests against the curved shoulder 18. A hook 74 on the outer end of the cable 73 engages the hook 72 on the arm 71. The inner end of the cable has a hook 75 which is arranged in hooking engagement with the hook 8 on the arm 5 of the crank A. The cable 73 bears against the curved shoulder 18 formed on the inner surface of the disc 1 as before described. The cable 73 may be armored by flexible protective covering 76 applied to the same between the opening 16 in the disc 1 and in hook 74. In the event such protective casing is utilized a socket member 77 is inserted in the opening 16 in the disc 1 for anchoring the inner end of the end of the protective casing 76.

Normally the brake shoes 18 and 19 are in braking engagement with the drum B maintained in such engagement by reason of the action of the spring 6 actuating the crank A to force the toggle C to spread the outer ends of the brake shoes 18 and 19.

Figures 4, 5, 6, and 7 illustrate means for spreading the inner ends of the brake shoes and wherein the faces of the inner ends of the brake shoes 18 and 19 are formed with recesses 80 and 81 which are arcuate in a direction from the outer to the inner peripheries of the brake shoes and rectangular width-wise of the shoes. A block 82 having an upper end shaped to conform to the recess 80 enters the recess with a portion of the block projecting below the face of the inner end of the shoe 18. A similar block 83 enters the recess 81 and is provided with an end to conform to the shape of the recess. Each of the blocks 82 and 83 is bored and threaded to receive the threaded ends 84 and 85 respectively of an adjusting bolt D. The bolt has its central portion provided with an enlarged polygonal portion 86 to which a tool may be applied for turning the bolt with respect to the blocks 82 and 83. The bolt D is retained in adjusted position by means of a spring 87 fastened at 88 to the block 83. The spring 87 is flat and is bent to tightly press against one of the faces of the central polygonal portion 86 to prevent turning movement of the bolt D. The faces of the inner ends of the brake shoes 18 and 19 are separated by turning the bolt D in one direction and brought together by turning the bolt in the opposite direction.

The fact that the recesses 80 and 81 are arcuate in one direction only prevents sidewise displacement of one brake shoe with respect to the other so that the inner ends of the brake shoes are constantly retained against sidewise displacement, thus insuring centralization of the shoes for proper braking action.

Additional means may be provided for maintaining the brake shoes in centralized position.

The brake shoe 18 is provided with a boss 89 which is slotted in a direction lengthwise of the brake shoe.

The plate 1 is apertured to receive a threaded bolt 90 the inner end of which has fastened to it a hub 91 carrying an eccentric cam 92. The cam 92 enters the recess in the pawl 39 as may be observed in Figures 4 and 6. A spring 93 surrounds the bolt 90 between the outer face of the plate 1 and the head 94 of the bolt so as to properly maintain the cam 92 in position with respect to the plate 1 to thus center the brake shoe 18 with respect to said plate. The bolt 90 may be turned so that the larger portion of the cam may engage the slot in the boss 89 as wear takes place, thus assuring at all times proper centering of the brake shoe 18 with respect to the plate 1.

It might, of course, so happen that the lateral adjusting means just described be associated with the brake shoe 19 as well as the brake shoe 18 if desired.

The springs 48 act to maintain the inner faces of the brake shoes against the blocks 82 and 83 of the adjusting bolt D.

When the brake of the form illustrated in Figure 4 is actuated in the manner described with respect to Figure 1, the shoes 18 and 19 will be moved out of contact with the drum B and the bolt D will then maintain the brake shoes 18 and 19 in centralized position so that on application of the brake the same will engage the drum with proper braking action. The provision of the cam 92 acts also to maintain the shoe 18 against lateral displacement with respect to the plate 1.

The bolt D and its associated blocks 82 and 83 act as a separator for the faces of the inner ends of the brake shoes 18 and 19 in the same manner that the bolt 27 acts as a separator for the brake shoes in the form illustrated in Figure 1.

The stop or anchor plate 9 cooperates with the notched ends 49 and 50 of the shoes 18 and 19 to center the outer ends of the shoes in line with the geometrical center of the brake drum B and also eliminates the horizontal component effect of the toggle C. The toggle C acts to move the outer ends of the brake shoes towards the anchor plate 9 when the shoes are moved in direction to release the brakes. Should either shoe be out of central position at that time it would engage the plate 9 ahead of the other shoe. However, the toggle C then becomes effective to move the other shoe against the plate, thus centralizing both shoes, so that when the shoes are applied in braking engagement such engagement will be uniform in all respects.

The notched ends 49 and 50 of the shoes 18 and 19 thus provide shoulders 96 and 97 for engaging the inner surface of the anchor plate 9 thereby limiting horizontal movement of the outer ends of the shoes in a direction away from the drum axis.

It will be observed that the present invention provides a brake construction for motor vehicles which is simple and at the same time effective in operation. The brake shoes are automatically maintained centralized by means of the adjusting nut 27 and the cooperating flat members 34 and 35 and the instrumentalities associated with the same.

The invention has been described herein more or less precisely as to details yet it is to be understood that changes may be made in the arrangement and proportion of parts and equivalents may be substituted without departing from the spirit and scope of the invention.

The invention is claimed as follows:

1. Brake mechanism for motor vehicles including in combination, a disc, said disc carrying the brake mechanism, a drum overlying said disc, brake shoes carried by said disc, a crank supported by said disc for moving the brake shoes into engagement with said drum, a flexible cable entering said disc and connected to said crank, said disc having a curved shoulder as a bearing for said cable, and means outwardly of said disc for actuating the cable to release the brake.

2. Brake mechanism for motor vehicles including in combination, a disc, brake shoes carried by said disc, a brake drum overlying said disc and said brake shoes, a crank pivoted to said disc, a toggle means connected to the outer ends of said shoes, a spring actuating said crank to move the same against the toggle to maintain the brake shoes in engagement with said drum, said crank having a hook at one end, a flexible encased cable having hooking engagement with the hook on said crank and operable outwardly of said disc for moving said crank in a direction to release the brake.

3. Brake mechanism for motor vehicles including in combination, a disc, brake shoes carried by said disc, a brake drum overlying said disc and said shoes, the outer ends of said shoes being connected by toggle means, a crank pivoted on said disc, a spring engaging said crank for moving it in a direction to spread the toggle and maintain the shoes in braking engagement with the drum, said crank having a hook, a cable entering said disc and having hooking engagement with said crank, a pedal disposed outwardly of said disc, said pedal having an arm with a hook thereon, said cable having a hook on its other end for engaging the hook on the pedal, said pedal being operable for moving the crank away from said toggle, and a spring for releasing the brake when said crank has been moved away from said toggle.

4. A brake mechanism for motor vehicles in combination, two brake shoes, an anchor plate between the outer ends of said shoes, the outer ends of said shoes being notched providing shoulders engaging the inner face of said plate, means including a toggle and a spring connecting the outer ends of said shoes and causing movement of said notched ends against said plate when the brake is released, said means maintaining the shoulders against the inner face of said plate to limit movement of the outer ends of the shoes in a direction away from the brake drum axis for centralizing the shoes.

5. A brake mechanism for motor vehicles, including in combination, a disc, said disc carrying the brake mechanism, a drum overlying said disc, brake shoes carried by said disc, a crank supported by said disc for moving the brake shoes into engagement with said drum, a flexible cable entering said disc and connected to said crank, and means outwardly of said disc for actuating the cable to release the brake.

6. A brake mechanism for motor vehicles including in combination, a disc, said disc carrying the brake mechanism, a drum overlying said disc, brake shoes carried by said disc, a crank supported by said disc for moving the brake shoes into engagement with said drum, a spring acting in cooperation with said crank to maintain said shoes normally in braking engagement with said drum, a flexible member passing through an aperture in said disc and connected to said crank, and means outwardly of said disc for actuating said flexible member to release the brake.

WILLIAM SCHROEDER.

CERTIFICATE OF CORRECTION.

Patent No. 1,959,878. May 22, 1934.

WILLIAM SCHROEDER.

It is hereby certified that error appears in the printed specification of the above numbered patent requiring correction as follows: Page 1, line 69, after the serial number "541,309" insert a comma and the words filed June 1, 1931; and that the said Letters Patent should be read with this correction therein that the same may conform to the record of the case in the Patent Office.

Signed and sealed this 24th day of July, A. D. 1934.

Bryan M. Battey (Seal) Acting Commissioner of Patents.